(12) United States Patent
Hoyos et al.

(10) Patent No.: US 7,735,730 B2
(45) Date of Patent: Jun. 15, 2010

(54) SYSTEM AND METHOD FOR STATE-BASED EXECUTION AND RECOVERY IN A PAYMENT SYSTEM

(75) Inventors: Carlos Antonio Lorenzo Hoyos, Morrisville, NC (US); Marcelo Perazolo, Cary, NC (US); Viswanath Srikanth, Chapel Hill, NC (US); Mark E. Peters, Chapel Hill, NC (US); Andrea Jean Watkins Moryadas, Brattleboro, VT (US)

(73) Assignee: International Business Machines Corporation, Armonk, NY (US)

( * ) Notice: Subject to any disclaimer, the term of this patent is extended or adjusted under 35 U.S.C. 154(b) by 1057 days.

(21) Appl. No.: 11/420,040

(22) Filed: May 24, 2006

(65) Prior Publication Data

US 2007/0288365 A1 Dec. 13, 2007

(51) Int. Cl.
 *G06K 5/00* (2006.01)
(52) U.S. Cl. .............. 235/384; 705/1; 705/35; 705/40; 714/3; 714/17; 714/57
(58) Field of Classification Search ............... 235/384; 705/1, 35, 40; 714/6, 17, 57
See application file for complete search history.

(56) References Cited

U.S. PATENT DOCUMENTS 6,810,489 B1 * 10/2004 Zhang et al. .............. 714/6
2001/0032128 A1 10/2001 Kepecs .................. 705/14
2001/0032183 A1 10/2001 Landry .................. 705/40
2002/0136375 A1 9/2002 Bouffard et al. ........ 379/114.01
2002/0156727 A1 10/2002 Le Vake et al. ............. 705/39
2003/0120554 A1 6/2003 Hogan et al. .............. 705/26
2003/0168509 A1 9/2003 Nielsen et al. ............ 235/379
2004/0236684 A1 11/2004 Yan ...................... 705/40
2005/0080723 A1 4/2005 Burchetta et al. .......... 705/39
2005/0096927 A1 * 5/2005 Mehta et al. ............... 705/1
2008/0156873 A1 * 7/2008 Wilhelm et al. .......... 235/384

FOREIGN PATENT DOCUMENTS

WO  WO 02100094 A2  12/2002

OTHER PUBLICATIONS

Office Action for co-pending U.S. Appl. No. 11/456,189, mailed Oct. 1, 2009, 11 pages.

* cited by examiner

*Primary Examiner*—Allyson N Trail
(74) *Attorney, Agent, or Firm*—VanLeeuwen & VanLeeuwen

(57) ABSTRACT

A system and method for state-based execution and recovery in a payment system is presented. A payment system uses a state machine to track completed sub-tasks using a state progress identifier and completion state data. When a failure occurs, stored completion state data and the state progress identifier indicate the last successfully completed sub-task. As such, when the payment system resumes payment operation execution after a failure, the state machine retrieves the stored completion state data and state progress identifier, and resumes execution based upon the retrieved information. As a result, the payment system continues payment operation execution at a point as to not duplicate the payment operation's previously completed sub-tasks.

17 Claims, 7 Drawing Sheets

```
300 ─┐
     public Results doPayment(
         final Context          context,
         final Long             orderId,         ─ 305
         final Long             releaseId,       ─ 310
         final BigDecimal       orderAmount,
         final String           currency,
         final PaymentInstruction pi);           ─ 315
```

| ORDER ID 325 | LINE ITEM 330 | RELEASE ID 335 | PAYMENT INSTRUCTIONS ||| |
|---|---|---|---|---|---|
| | | | AMOUNT 340 | ACCOUNT # 350 | ATTRIBUTE 355 |
| ABCD | 1 | 1111 | $60 | 124895421485 | 3/08 |
| | 2 | | | | |
| | 3 | 1112 | $100 | 165897524655 | 4/07 |
| | 4 | -- | $210 | 124895421485 | 6/08 |
| EFGH | 1 | 1121 | $65 | 6855554655456 | 12/07 |

| PAYMENT ID |||| ORDER ID 390 | RELEASE ID 395 |
|---|---|---|---|---|---|
| AMOUNT 370 | ACCOUNT # 375 | ATTRIBUTE 380 | PHASE 385 | | |
| $38 | 124895421485 | 4/09 | Process | SFGSGF | 7657 |
| $75 | 165897524655 | 8/07 | Fulfillment | RYRHH | 9245 |
| $87 | 165897524655 | 4/07 | Shipment | GSFGS | 7778 |

SYSTEM AND METHOD FOR STATE-BASED EXECUTION AND RECOVERY IN A PAYMENT SYSTEM

BACKGROUND OF THE INVENTION

1. Technical Field

The present invention relates to a system and method for state-based execution and recovery in a payment system. More particularly, the present invention relates to a system and method for using a state machine to track a payment operation's completed sub-tasks and continue execution, after a failure, at a point within the payment operation as to not duplicate the payment operation's previously completed sub-tasks.

2. Description of the Related Art

Software-based payment systems today rely upon common techniques to orchestrate financial transactions between external payment providers (e.g., credit card companies). These payment systems perform various jobs in order to successfully handle payment operations associated with an order. Payment operations include, but are not limited to, order processing, payment-related events, data management, transaction management, and error handling.

While performing a payment operation, a payment system may experience a failure do to reasons such as a lack of network connectivity or temporary payment processor downtimes. When a failure occurs in the middle of executing a payment operation, a challenge found is that the payment system has to re-execute the entire payment operation, regardless of whether the payment operation was almost complete.

In addition, the payment operation may have interacted with an external payment provider by sending financial transaction requests and receiving financial transaction results (e.g., validation, payment, etc,). In these cases, when the payment system re-executes a payment operation from the beginning, the payment operation sends duplicate financial transaction requests to the payment provider. A challenge found is that payment providers may not allow a payment system to "roll back" or cancel a financial transaction. Furthermore, a challenge found is that the payment system typically requires manual intervention in order to correct problems when a payment operation partially completes.

What is needed, therefore, is a system and method for executing a partially completed payment operation without re-executing previously completed payment operation steps.

SUMMARY

It has been discovered that the aforementioned challenges are resolved using a system and method for using a state machine to track a payment operation's completed sub-tasks and continue execution, after a failure, at a point within the payment operation as to not duplicate the payment operation's previously completed sub-tasks. A payment system uses the state machine to track completed sub-tasks using a state progress identifier and completion state data. When a failure occurs, stored completion state data and the state progress identifier indicate the last successfully completed sub-task. As such, when the payment system resumes payment operation execution after a failure, the state machine retrieves the stored completion state data and state progress identifier, and resumes execution based upon the retrieved information.

A customer places an order with an order system by sending order and payment details to the order system. For example, the customer may place an order on a web page for office supplies, in which case the order and payment details may include line item information for the office supplies along with credit card information to pay for the office supplies.

The order system sends a payment operation request to a payment system. In turn, the payment system invokes a payment operation and uses a state machine to track the progress of sub-tasks that comprise the payment operation. When a sub-task completes, the state machine increments a state progress identifier and stores completion state data corresponding to the completed sub-task. When a payment operation fails during a subsequent sub-task, the payment system is able to retrieve the state progress identifier and completion state data corresponding to the previously completed sub-task, and continue to process the payment operation from the failure point.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 3A is a diagram showing interface information for a payment system that permits external components to request payment operations;

FIG. 3B is a table showing payment parameters for customer orders;

FIG. 3C is a table showing a list of payment identifiers, order identifiers, and release identifiers that correspond to payment operation requests;

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
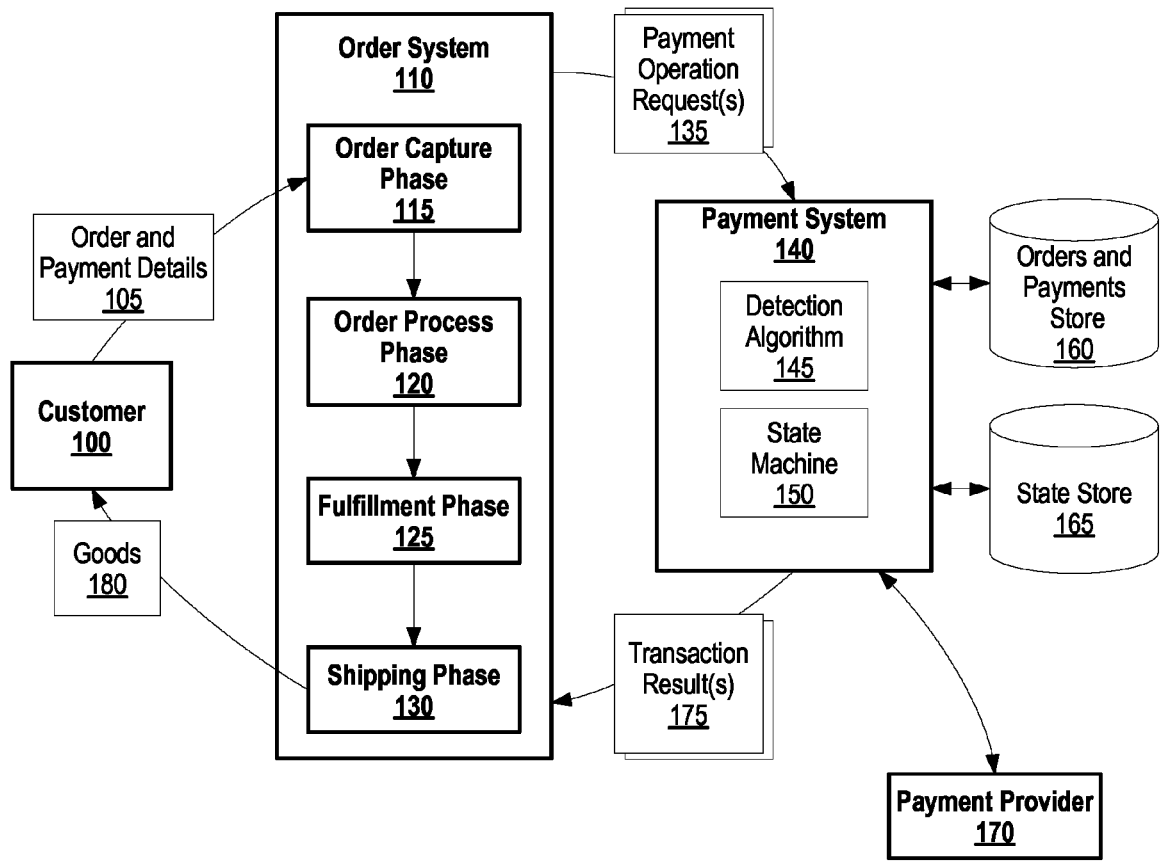
FIG. 1 is a diagram showing a payment system receiving and processing payment operation requests from an order system.

FIG. 1 is a diagram showing a payment system receiving and processing payment operation requests from an order system. Customer 100 places an order with order system 110 by sending order and payment details 105. For example, customer 100 may place an order on a web page for office supplies, in which case order and payment details 105 may include line item information for the office supplies along with credit card information to pay for the office supplies.

The embodiment shown in FIG. 1 shows that order system 110 includes four "order phases" to process customer 100's order, which are order capture phase 115, order process phase 120, fulfillment phase 125, and shipping phase 130. Order capture phase 115 receives order and payment details 105 from customer 100. Order process phase 120 processes the order once customer 100 completes the order (e.g., checks out). Fulfillment phase 125 allocates goods to all or a part of customer 100's order and, shipping phase 130 ships the goods (goods 180) to customer 100. As one skilled in the art can appreciate, an order system may have more or less order phases that what is shown in FIG. 1.

While processing customer 100's order, order system 110 generates an order identifier, which uniquely identifies customer 100's order. Order system 110 also generates a release identifier, which uniquely identifies all or part of customer 100's order that is ready to release for shipment. Order system 110 sends the order identifier, the release identifier, and one or more payment operation requests 135 to payment system 140. Payment operation requests 135 may include:

Payment Instruction Validation Request (during order capture phase 115);

Payment Instruction Storage Request (during order process phase 120);

Process Payment Instruction After Allocation Request (during fulfillment phase 125); and Process Payment Instruction After Shipment Request (during shipping phase 130).

Some payment operation requests 135 involve payment system 140 sending a "financial transaction request" to payment provider 170, which may be an external payment provider (e.g., credit card company). In turn, payment provider 170 sends a "financial transaction result" back to payment system 140. When received, payment system 140 sends the financial transaction results (transaction results 175) to order system 110, and also stores the financial transaction results in orders and payments store 160.

In many cases, order system 110 may unintentionally send a duplicate payment operation request 135 to payment system 140. Payment system 140 uses detection algorithm 145 to circumvent interaction with payment provider 170 when it receives a duplicate payment operation request. Detection algorithm 145 detects duplicate payment operation requests using the order identifier, the release identifier (if applicable), and a payment identifier, which includes payment instructions and an order phase (see FIG. 3C and corresponding text for further details).

When detection algorithm 145 detects a duplicate payment operation request, detection algorithm 145 does not send a financial transaction request to payment provider 170. Instead, detection algorithm 145 instructs payment provider 140 to retrieve the financial transaction results previously stored in orders and payments store 160, and send the financial transaction results (transaction results 175) to order system 110. By detecting duplicate payment operation requests, payment system 140 alleviates duplicate requests to payment provider 170 that, in turn, reduces cost and eliminates rollback situations (see FIGS. 2-4 and corresponding text for further details).

In addition to receiving duplicate payment operation requests, events may occur at payment system 140 that prevent a payment operation from completing. For example, payment provider 140 may have completed two out of six "sub-tasks" that comprise a particular payment operation, and a failure occurs during the third sub-task. In these circumstances, payment system 140 uses state machine 150 in order to prevent duplication of the two successfully completed sub-tasks.

State machine 150 tracks successfully completed sub-tasks, and stores completion state data and a state progress identifier in state store 165. As a result, when payment system 140 re-initiates a failed payment operation, payment system 140 is able to retrieve the state progress identifier and completion state data from state store 165, and continue processing the payment operation at the previously failed sub-task point instead of starting at the beginning of the payment operation. Using the example discussed above, payment system 140 re-initiates the payment operation at the third sub-task, which eliminates duplicating the first and second sub-tasks (see FIGS. 5-7 and corresponding text for further details).

Figure 2:
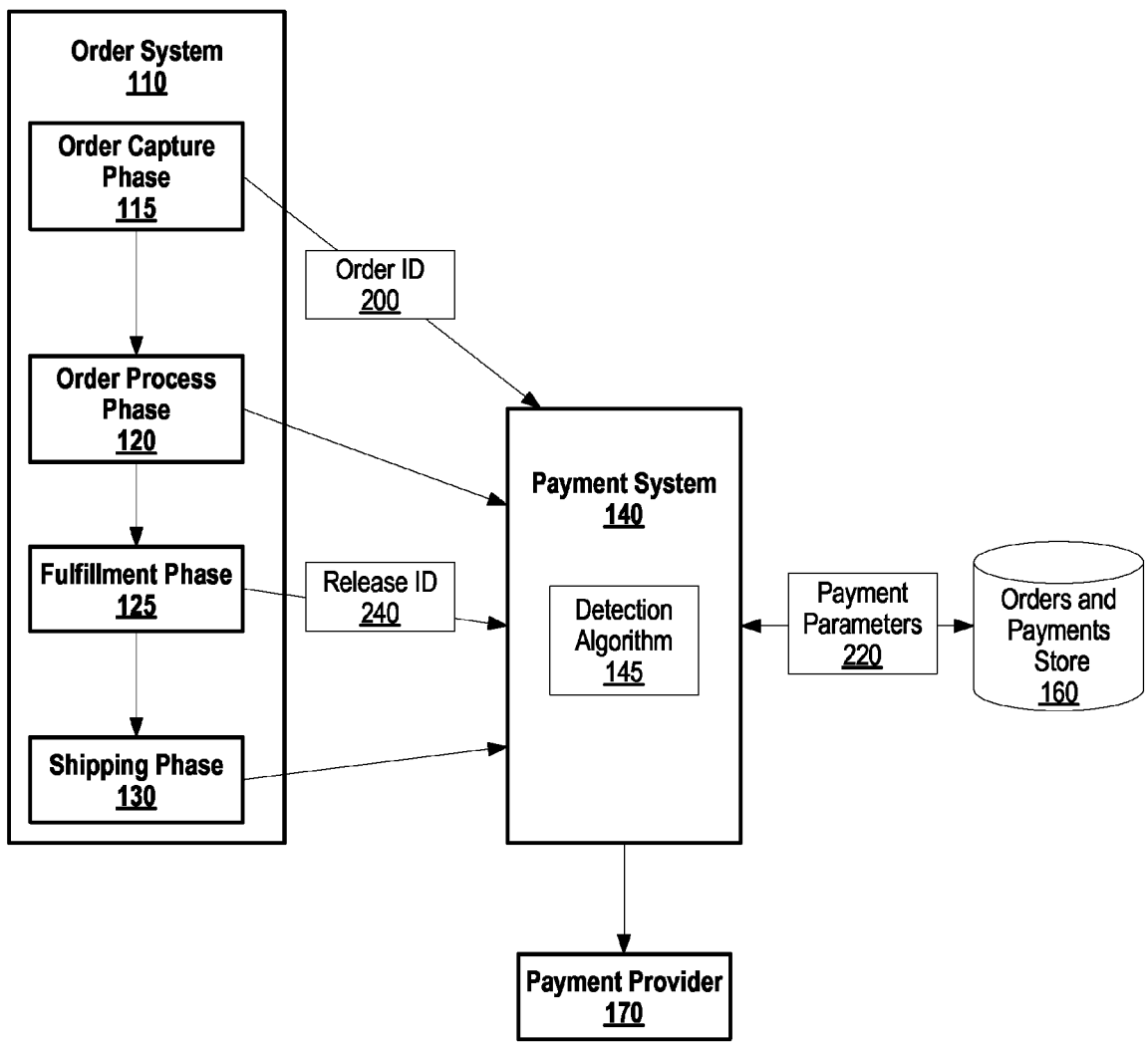
FIG. 2 is a diagram showing a payment system receiving payment parameters from an order system, and using the payment parameters to identify duplicate payment operation requests.

FIG. 2 is a diagram showing a payment system receiving payment parameters from an order system, and using the payment parameters to identify duplicate payment operation requests. As order system 110 receives and processes a customer order, order system 110 generates order identifier 200 and release identifier 240. During order capture phase 115, order system 110 generates and sends order identifier 200 to payment system 140, which identifies a customer's order, such as "#009793." Payment system 140 stores order identifier 200 as a payment parameter (payment parameters 220) in orders and payments store 160.

As order system 110 proceeds through order process phase 120 and reaches fulfillment phase 125, order system 110 generates and sends release identifier 240 to payment system 140. Release identifier 240 identifies particular line items of an order that are available and allocated for release. Again, payment system 140 stores release identifier 240 as a payment parameter in orders and payments store 160. In turn, order system 110 proceeds to shipping phase 130 and ships goods to the customer.

When payment system 140 receives a payment operation request from order system 110, payment system 140 retrieves payment parameters 220 from orders and payments store 160. In addition, payment system 140 generates a payment identifier to correspond with the payment operation request (see FIG. 4 and corresponding text for further details). Detection algorithm 145 uses the payment identifier, the order identifier, and the release identifier (if applicable) to determine whether the payment operation request is a duplication of a previously received payment operation request.

When the payment operation request is a duplication, payment system 140 retrieves already stored financial transaction results from orders and payments store 160, and provides the financial transaction results to order system 110. When the payment operation request is not a duplicate, payment system 140 sends a financial transaction request to payment provider 170. In turn, payment provider 170 sends financial transaction results to payment system 140, which payment system 140 sends to order system 110 and also stores in orders and payments store 160 (see FIG. 4 and corresponding text for further details). Order system 110, order capture phase 115, order process phase, 120, fulfillment phase 125, shipping phase 130, payment system 140, detection algorithm 145, orders and payments store 160, and payment provider 170 are the same as that shown in FIG. 1.

FIG. 3A is a diagram showing interface information for a payment system that permits external components to request payment operations. An external component, such as order system 110, uses interface 300 to send a payment operation request to a payment system (e.g., payment system 140). The invention described herein adds lines 305 and 310 to a typical interface, which include order identifier information and release identifier information, respectively.

When an order system sends a payment operation request to a payment system, the order system provides an order identifier to the payment system in line 305, which is a unique system-wide identifier that is assigned to a customer's order when the customer places the order. When the order system releases all or part of an order, the order system assigns a release identifier, which is included in line 310. The release identifier uniquely identifies a set of products in an order that are shipped together, such as a "package" that includes goods, which are shipped to a customer.

Line 315 includes payment instruction information for an order, which may include an account number, an account expiration date, an address, and a customer name. The payment system includes the payment instruction information in a payment identifier, in which the payment system uses to identify duplicate payment operation requests (see FIGS. 3C, 4, and corresponding text for further details).

FIG. 3B is a table showing payment parameters for customer orders. Table 320 includes columns 325 through 355. Column 325 includes a list of order identifiers associated with customer orders. Column 330 includes a list of line items for particular orders (order identifiers). For example, the first order identifier in table 320 includes four line items. Column 335 includes a list of release identifiers that correspond to one or more line items. The release identifiers are assigned to an order when their associated goods are available for release. Each release identifier may be associated with a particular "package" that is shipped to a customer.

Columns 340-355 include payment instructions for an order. A customer may provide multiple payment instructions for a single order, such as charging part of an order to one credit card, and charging the remaining part of the order to another credit card. Column 340 includes a list of amounts for particular release identifiers. For example, row 358 includes an amount of $60 for release identifier 1111, which includes line items 1 and 2 of order ABCD.

Column 350 includes a list of account numbers, such as credit card numbers, to pay for particular line items. And, column 355 includes a list of attributes for the payment instructions, such as expiration dates or card verification numbers.

FIG. 3C is a table showing a list of payment identifiers, order identifiers, and release identifiers that correspond to payment operation requests. When a payment system receives a payment operation request, the payment system logs information in table 360. As a result, the payment system is able to analyze table 360 when it receives subsequent payment operation requests and determine whether the payment operation request is a duplication.

Table 360 includes columns 370-395. Columns 370-380 include a list of payment instructions for corresponding orders (see FIG. 3B and corresponding text for further details). Column 385 includes a list of order phases that the payment system receives a payment operation request. For example, the payment system generated row 398 when it received a payment operation request from an order system when the order system was in the fulfillment phase. Columns 390 and 395 include a list of order identifiers and release identifiers, respectively, that the payment system uses during the detection of duplicate payment operation requests (see FIG. 4 and corresponding text for further details).

Figure 4:
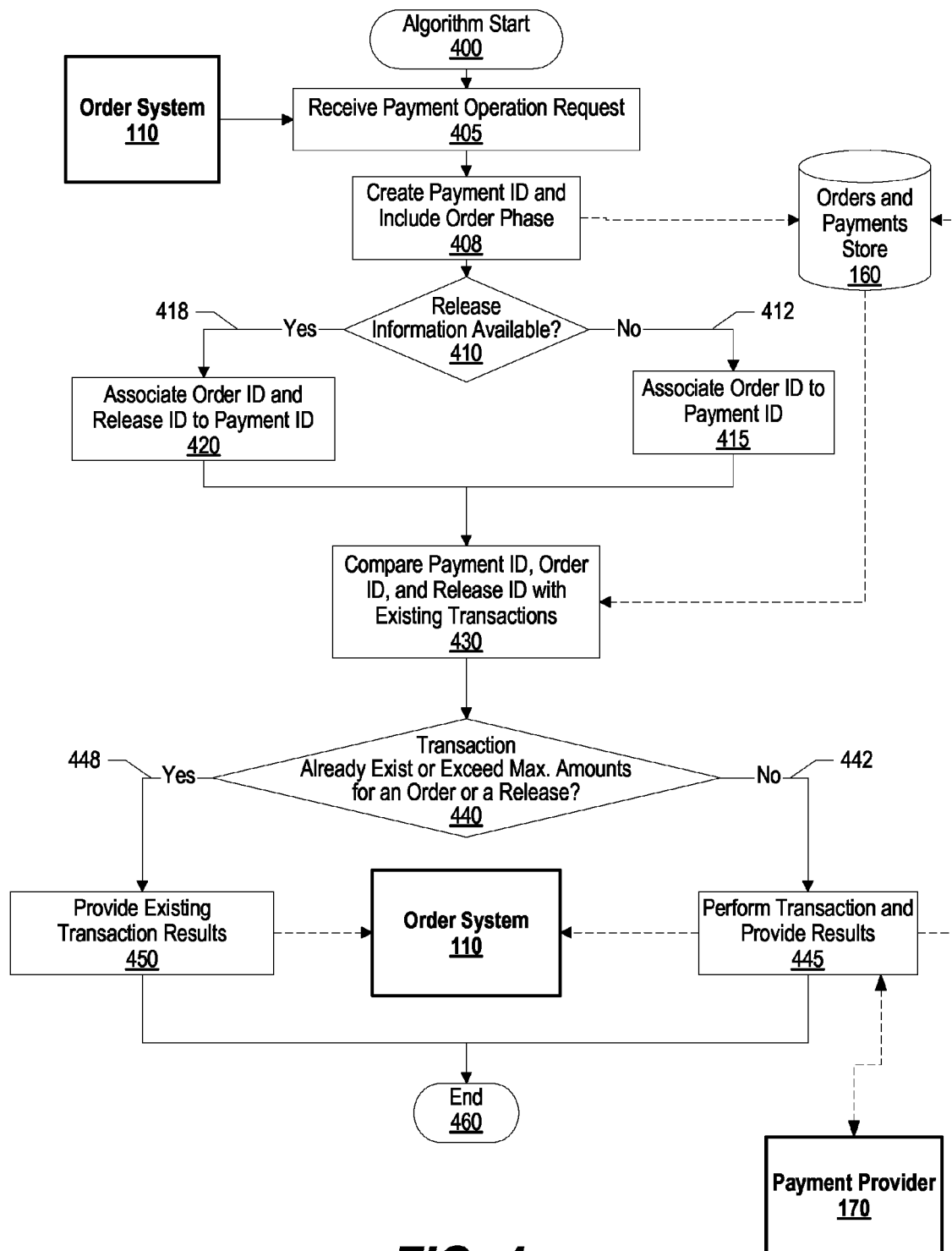
FIG. 4 is a flowchart showing steps taken in determining whether to send a financial transaction request to a payment provider.

FIG. 4 is a flowchart showing steps taken in determining whether to send a financial transaction request to a payment provider. A payment system uses a detection algorithm to determine when an order system sends a duplicate payment operation request. Processing commences at 400, whereupon processing receives a payment operation request from order system 110 at step 405. The payment operation request includes payment parameters, such as an order identifier and a release identifier. At step 408, processing creates a payment identifier that includes payment instructions as well as an "order phase." The order phase is an order system's phase at which the payment operation is sent. Processing stores the created payment identifier in orders and payments store 165. Order system 110 and orders and payments store 160 are the same as that shown in FIG. 1.

A determination is made as to whether a release identifier is available that corresponds to the payment operation request (decision 410). For example, the order system may have provided a release identifier that signifies that particular line items are available for release to fulfillment. If a release identifier is not available, decision 410 branches to "No" branch 412 whereupon processing associates the order identifier with the payment identifier at step 415. On the other hand, if the release identifier is available, decision 410 branches to "Yes" branch 418 whereupon processing associates the payment identifier with the order identifier and the release identifier.

At step 430, processing compares the payment identifier, the order identifier, and the release identifier (if applicable) to stored transaction information in orders and payments store 160. A determination is made as to whether financial transaction results already exist for the particular identifier combination, signifying that the payment operation is a duplicate (decision 440). Processing also checks for whether the payment operation request exceeds a maximum amount for an order or a release.

If the identifier combination does not already exist and the payment request does not exceed a maximum amount, decision 440 branches to "No" branch 442 whereupon processing sends a financial transaction request to payment provider 170 that, as a result, provides financial transaction results. These results are then sent to order system 110 and stored in orders and payments store 165 (step 445). Payment provider 170 is the same as that shown in FIG. 1.

On the other hand, if a transaction already exits for the payment request, or the payment request is requesting an amount that exceeds a limit, decision 440 branches to "Yes" branch 448 whereupon processing provides order system 110 with the existing financial transaction results, and does not interact with payment provider 170 (step 450). Processing ends at 460.

Figure 5A:
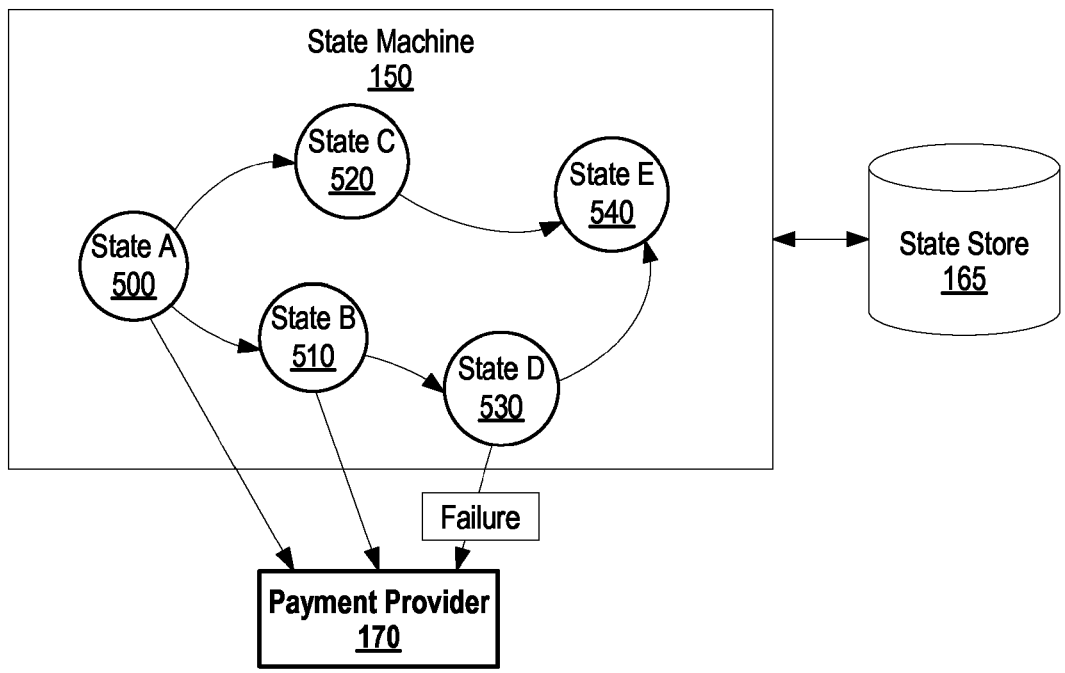
FIG. 5A is a diagram showing a state machine partially completing a payment operation that includes multiple sub-tasks.

FIG. 5A is a diagram showing a state machine partially completing a payment operation that includes multiple sub-tasks. State machine 150 includes five states that correspond to five sub-tasks, which are state A 500, state B 510, state C 520, state D 530, and state E 540. Examples of sub-tasks include:

Retrieve payment information and save to a persistent data store.

Retrieve sets of payment configurations and policies that determine what financial transactions to perform in order to process a determined event.

Establish communications with an external payment provider.

Perform financial transactions by communicating with the external payment provider.

Receive financial transaction results from the external payment provider, or querying the external payment provider in order to determine such results.

Process results and save them into a persistent data store.

Provide appropriate response and make available as the result of a task.

FIG. 5A shows that state machine 150 proceeded through states 500, 510, and 520, in which case interaction with payment provider 170 occurred at states 500 and 510. At each state, state machine 150 logs the completion of a sub-task and stores completion state data in state store 165 (see FIG. 6 and corresponding text for further details). State store 165 is the same as that shown in FIG. 1.

While proceeding to state D 530, a failure occurred, which prevents state machine 150 from completing a payment operation. Since state machine 150 logged sub-task completion state data up to state C 520, state machine 150 is able to resume sub-task processing at state D 530 (see FIG. 5B and corresponding text for further details).

Figure 5B:
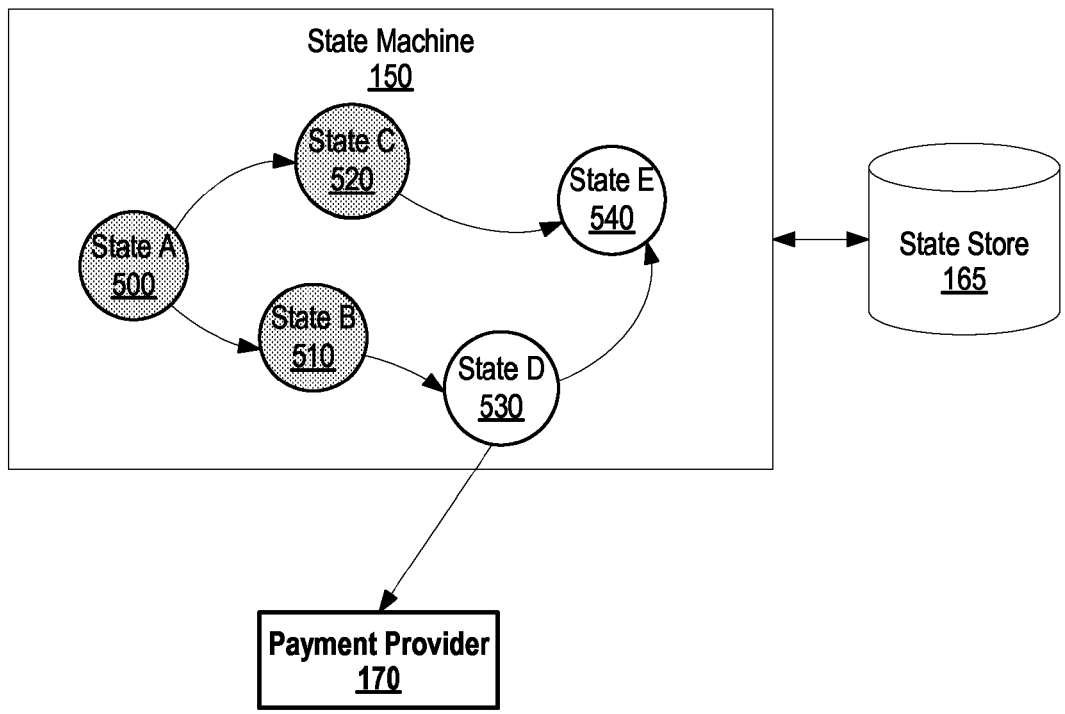
FIG. 5B is a diagram showing a state machine completing a partially completed payment operation.

FIG. 5B is a diagram showing a state machine completing a partially completed payment operation. State machine 150 previously completed sub-tasks that resulted in the payment operation reaching state C 520, whose completion state data is stored in state store 165 (see FIG. 5A and corresponding text for further details). As such, state machine 150 retrieves the completion state data for state C 520 and resumes payment operation processing. Subsequently, state machine 150 completes the payment operation by proceeding through state D 530 and state E 540. As can be seen, state machine 150 interacts with payment provider 170 at state D 530, but does not duplicate interaction with payment provider 170 at state A 500 and state B 510 as shown in FIG. 5A.

Figure 6:
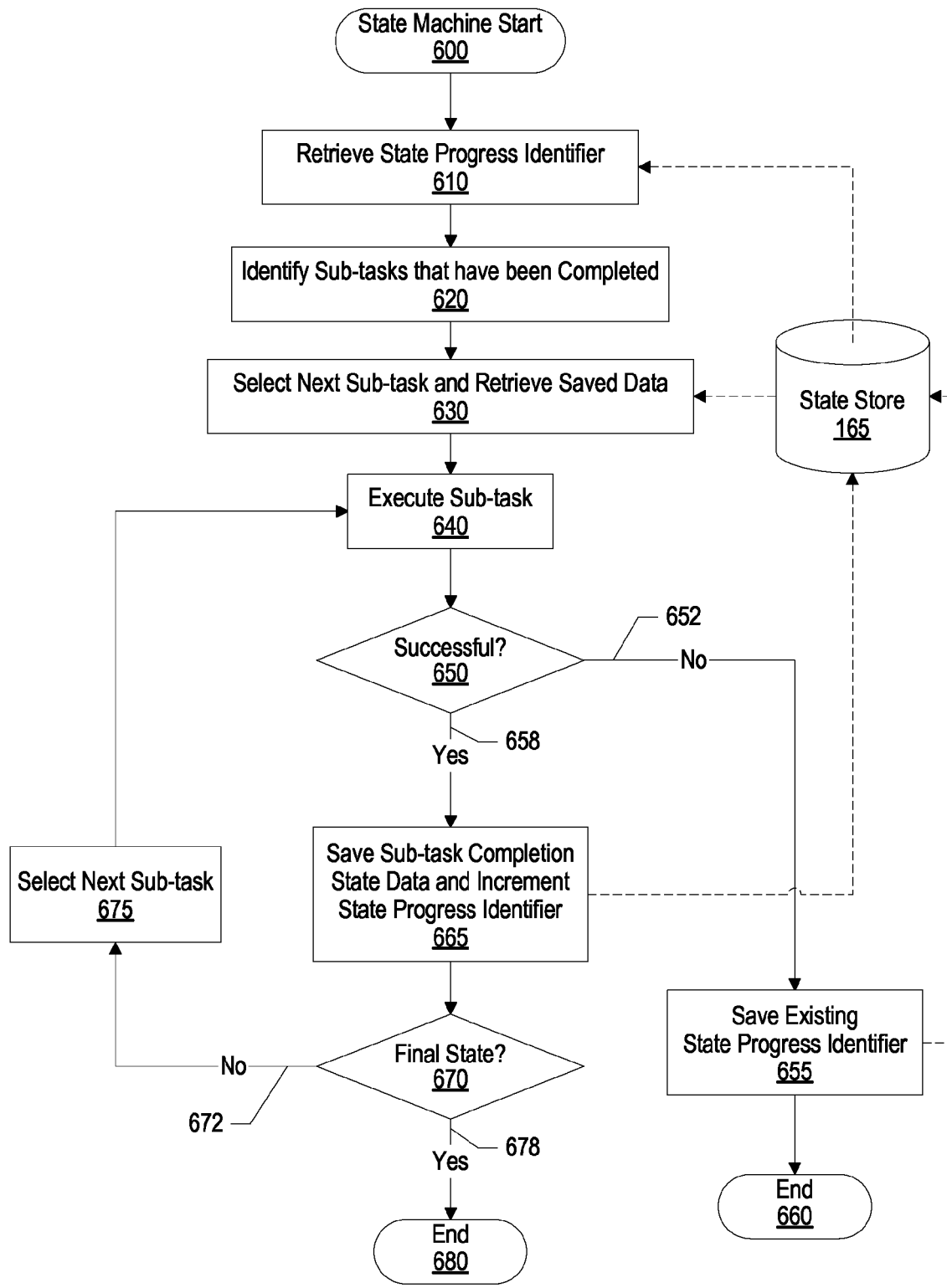
FIG. 6 is a flowchart showing steps taken in completing a payment operation on a sub-task-by-sub-task basis.

FIG. 6 is a flowchart showing steps taken in completing a payment operation on a sub-task-by-sub-task basis. Processing commences at 600, whereupon processing retrieves a state progress identifier corresponding to a partially completed payment operation from state store 165 (step 610). At step 620, processing uses the state progress identifier to identify subtasks that have already been completed. For example, the state progress identifier may be "4," which signifies that the first four sub-tasks of a payment operation completed successfully. State store 165 is the same as that shown in FIG. 1.

At step 630, processing selects the next sub-task, which is the sub-task following the last completed sub-task, and retrieves completion state data from state store 165. Using the example described above, processing retrieves the fourth sub-tasks completion state data, and selects the fifth sub-task to execute next. At step 640, processing executes the next sub-task.

A determination is made as to whether the sub-task executed successfully (decision 650). If the sub-task did not execute successfully, decision 650 branches to "No" branch 652 whereupon processing saves the same state progress identifier in state store 165, and processing ends at 660.

On the other hand, if the sub-task's execution was successful, decision 650 branches to "Yes" branch 658 whereupon processing saves the sub-task's completion state data and increments the state progress identifier in state store 165 (step 665). A determination is made as to whether processing reached the final state of the payment operation (decision 670). If processing has not reached the final state of the payment operation, decision 670 branches to "No" branch 672 whereupon processing selects (step 675) and processes the next sub-task. This looping continues until processing reaches the payment operation's final state, at which point decision 670 branches to "Yes" branch 678 whereupon processing ends at 680.

In one embodiment, processing may identify a "best path" to complete a payment operation based upon customer payment policies, such as creating new payment transactions and canceling older payment transactions. In this embodiment, processing may calculate the differences of transaction amounts still pending, and reuse validated, but partially completed, payment instruction transactions in order to provide a better chance that the transaction is successful.

Figure 7:
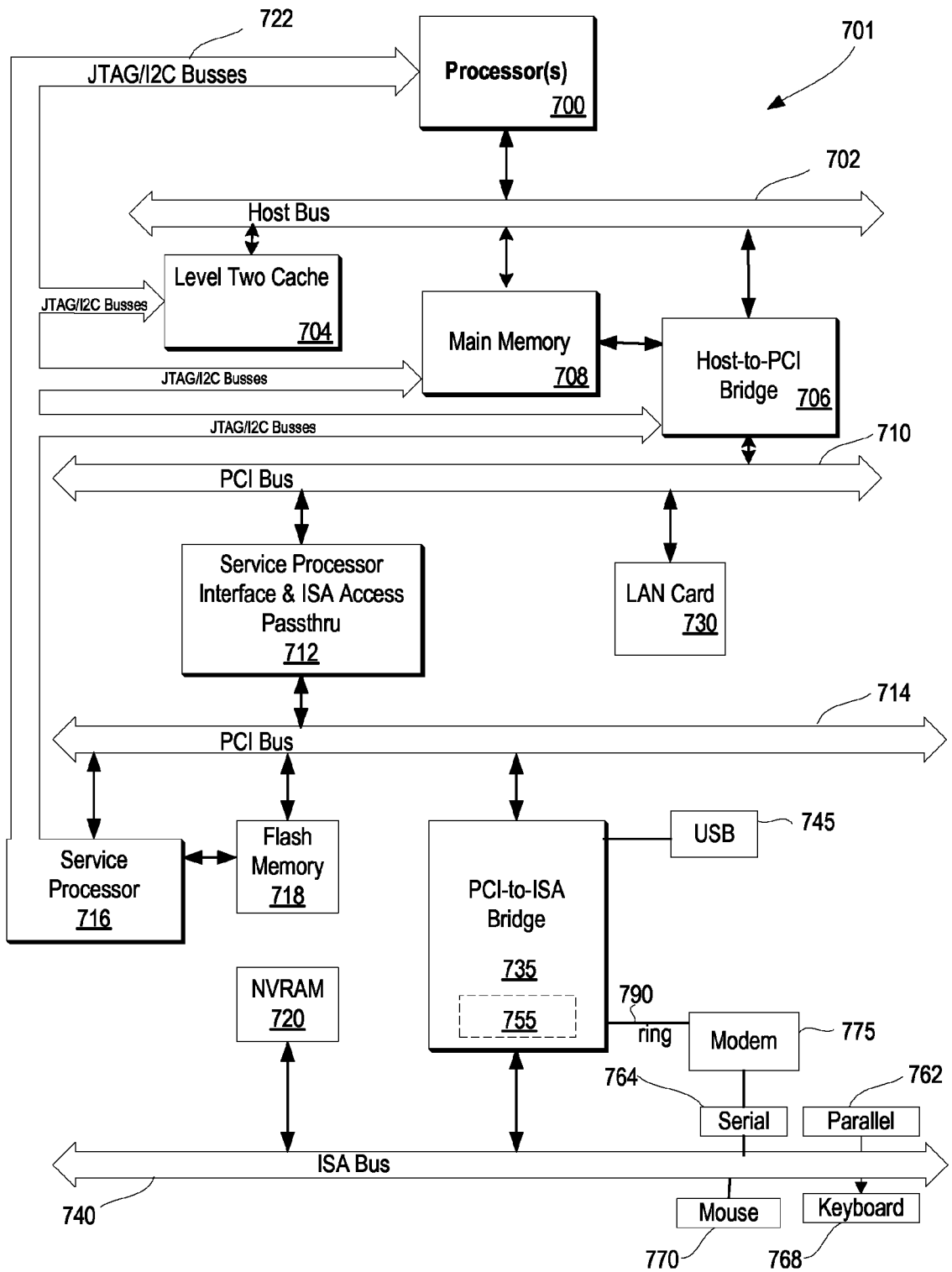
FIG. 7 is a block diagram of a computing device capable of implementing the present invention.

FIG. 7 illustrates information handling system 701, which is a simplified example of a computer system capable of performing the computing operations described herein. Computer system 701 includes processor 700 which is coupled to host bus 702. A level two (L2) cache memory 704 is also coupled to host bus 702. Host-to-PCI bridge 706 is coupled to main memory 708, includes cache memory and main memory control functions, and provides bus control to handle transfers among PCI bus 710, processor 700, L2 cache 704, main memory 708, and host bus 702. Main memory 708 is coupled to Host-to-PCI bridge 706 as well as host bus 702. Devices used solely by host processor(s) 700, such as LAN card 730, are coupled to PCI bus 710. Service Processor Interface and ISA Access Pass-through 712 provides an interface between PCI bus 710 and PCI bus 714. In this manner, PCI bus 714 is insulated from PCI bus 710. Devices, such as flash memory 718, are coupled to PCI bus 714. In one implementation, flash memory 718 includes BIOS code that incorporates the necessary processor executable code for a variety of low-level system functions and system boot functions.

PCI bus 714 provides an interface for a variety of devices that are shared by host processor(s) 700 and Service Processor 716 including, for example, flash memory 718. PCI-to-ISA bridge 735 provides bus control to handle transfers between PCI bus 714 and ISA bus 740, universal serial bus (USB) functionality 745, power management functionality 755, and can include other functional elements not shown, such as a real-time clock (RTC), DMA control, interrupt support, and system management bus support. Nonvolatile RAM 720 is attached to ISA Bus 740. Service Processor 716 includes JTAG and I2C busses 722 for communication with processor(s) 700 during initialization steps. JTAG/I2C busses 722 are also coupled to L2 cache 704, Host-to-PCI bridge 706, and main memory 708 providing a communications path between the processor, the Service Processor, the L2 cache, the Host-to-PCI bridge, and the main memory. Service Processor 716 also has access to system power resources for powering down information handling device 701.

Peripheral devices and input/output (I/O) devices can be attached to various interfaces (e.g., parallel interface 762, serial interface 764, keyboard interface 768, and mouse interface 770 coupled to ISA bus 740. Alternatively, many I/O devices can be accommodated by a super I/O controller (not shown) attached to ISA bus 740.

In order to attach computer system 701 to another computer system to copy files over a network, LAN card 730 is coupled to PCI bus 710. Similarly, to connect computer system 701 to an ISP to connect to the Internet using a telephone line connection, modem 775 is connected to serial port 764 and PCI-to-ISA Bridge 735.

While FIG. 7 shows one information handling system that employs processor(s) 700, the information handling system may take many forms. For example, information handling system 701 may take the form of a desktop, server, portable, laptop, notebook, or other form factor computer or data processing system. Information handling system 701 may also take other form factors such as a personal digital assistant (PDA), a gaming device, ATM machine, a portable telephone device, a communication device or other devices that include a processor and memory.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   receiving a payment operation request;
   initiating a payment operation, wherein the payment operation includes a plurality of sub-tasks;
   processing a first sub-task that is included in the plurality of sub-tasks, the processing resulting in the completion of the first sub-task;
   incrementing a state progress identifier in response to the completion of the first sub-task;
   initiating, after completing the first sub-task, a second sub-task that is included in the plurality of sub-tasks;
   detecting a failure of the second sub-task after the initiation of the second sub-task;
   identifying, after the detecting, the completion of the first sub-task using the incremented state progress identifier;
   selecting the second sub-task using the incremented state progress identifier; and
   completing, in response to the identifying, the second sub-task without repeating the processing of the first sub-task.

2. The method of claim 1 further comprising:
   after completing the first sub-task, storing completion state data that results from the first sub-task; and
   retrieving the completion state data in order to complete the second sub-task.

3. The method of claim 1 wherein the first sub-task includes sending a financial transaction request to an external payment provider, the method further comprising:
   receiving financial transaction results from the external payment provider in response to the financial transaction request; and
   storing the financial transaction results.

4. The method of claim 3 further comprising:
   receiving a subsequent payment operation request;
   identifying that the subsequent payment operation request is a duplication of the payment operation request;
   in response to identifying that the subsequent payment operation request is a duplication of the payment operation request, retrieving the stored financial transaction results; and
   sending the financial transaction results to an order system.

5. The method of claim 1 wherein the payment operation is selected from the group consisting of a payment instruction validation, a payment instruction storage, a process payment instruction after allocation, and a process payment instruction after shipment.

6. The method of claim 1 wherein the method is performed using an e-commerce payment system state machine.

7. A computer program product stored on a computer operable media, the computer operable media containing instructions for execution by a computer, which, when executed by the computer, cause the computer to implement a method for executing a partially completed payment operation, the method comprising:
   receiving a payment operation request;
   initiating a payment operation, wherein the payment operation includes a plurality of sub-tasks;
   processing a first sub-task that is included in the plurality of sub-tasks, the processing resulting in the completion of the first sub-task;
   incrementing a state progress identifier in response to the completion of the first sub-task
   initiating, after completing the first sub-task, a second sub-task that is included in the plurality of sub-tasks;
   detecting a failure of the second sub-task after the initiation of the second sub-task;
   identifying, after the detecting, the completion of the first sub-task using the incremented state progress identifier;
   selecting the second sub-task using the incremented state progress identifier; and
   completing, in response to the identifying, the second sub-task without repeating the processing of the first sub-task.

8. The computer program product of claim 7 wherein the method further comprises:
   after completing the first sub-task, storing completion state data that results from the first sub-task; and
   retrieving the completion state data in order to complete the second sub-task.

9. The computer program product of claim 7 wherein the first sub-task includes sending a financial transaction request to an external payment provider, the method further comprising:
   receiving financial transaction results from the external payment provider in response to the financial transaction request; and
   storing the financial transaction results.

10. The computer program product of claim 9 wherein the method further comprises:
 receiving a subsequent payment operation request;
 identifying that the subsequent payment operation request is a duplication of the payment operation request;
 in response to identifying that the subsequent payment operation request is a duplication of the payment operation request, retrieving the stored financial transaction results; and
 sending the financial transaction results to an order system.

11. The computer program product of claim 7 wherein the payment operation is selected from the group consisting of a payment instruction validation, a payment instruction storage, a process payment instruction after allocation, and a process payment instruction after shipment.

12. An information handling system comprising:
 one or more processors;
 a memory accessible by the processors;
 one or more nonvolatile storage devices accessible by the processors; and
 a payment operation request tool for executing partially completed payment operations, the payment operation request tool being effective to:
  receive a payment operation request over a computer network;
  initiate a payment operation, wherein the payment operation includes a plurality of sub-tasks;
  process a first sub-task that is included in the plurality of sub-tasks, the processing resulting in the completion of the first sub-task;
  increment a state progress identifier in response to the completion of the first sub-task;
  initiate, after completing the first sub-task, a second sub-task that is included in the plurality of sub-tasks;
  detect a failure of the second sub-task after the initiation of the second sub-task;
  identify, after the detecting, the completion of the first sub-task based using the incremented state progress identifier;
  select the second sub-task using the incremented state progress identifier; and
  complete, in response to the identifying, the second sub-task without repeating the processing of the first sub-task.

13. The information handling system of claim 12 wherein the payment operation request tool is further effective to:
 after completing the first sub-task, store completion state data that results from the first sub-task in one of the nonvolatile storage devices; and
 retrieve the completion state data from one of the nonvolatile storage devices in order to complete the second sub-task.

14. The information handling system of claim 12 wherein the first sub-task includes sending a financial transaction request to an external payment provider over the computer network, the payment operation request tool further effective to:
 receive financial transaction results from the external payment provider over the computer network in response to the financial transaction request; and
 store the financial transaction results in one of the nonvolatile storage devices.

15. The information handling system of claim 14 wherein the payment operation request tool is further effective to:
 receive a subsequent payment operation request;
 identify that the subsequent payment operation request is a duplication of the payment operation request;
 in response to identifying that the subsequent payment operation request is a duplication of the payment operation request, retrieve the stored financial transaction results from one of the nonvolatile storage devices; and
 send the financial transaction results to an order system over the computer network.

16. The information handling system of claim 12 wherein the payment operation is selected from the group consisting of a payment instruction validation, a payment instruction storage, a process payment instruction after allocation, and a process payment instruction after shipment.

17. The information handling system of claim 12 wherein the payment operation request tool includes an e-commerce payment system state machine.

* * * * *